(12) United States Patent
Fischer et al.

(10) Patent No.: US 7,980,592 B2
(45) Date of Patent: Jul. 19, 2011

(54) BI-LOBULAR AIR BAG

(75) Inventors: Kurt F. Fischer, Leonard, MI (US);
Douglas M. Gould, Lake Orion, MI (US); Kim Popek, Shelby Township, MI (US); Cathy Reis, Lake Orion, MI (US); John Klakulak, Clinton Township, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 90 days.

(21) Appl. No.: 12/454,632

(22) Filed: May 20, 2009

(65) Prior Publication Data
US 2009/0224522 A1    Sep. 10, 2009

Related U.S. Application Data

(63) Continuation-in-part of application No. 11/432,062, filed on May 11, 2006, now Pat. No. 7,607,683.

(51) Int. Cl.
*B60R 21/231* (2011.01)
*B60R 21/16* (2006.01)

(52) U.S. Cl. .................. 280/743.1; 280/730.1

(58) Field of Classification Search ........... 280/730.1, 280/743.1, 729
See application file for complete search history.

(56) References Cited

U.S. PATENT DOCUMENTS

| | | | |
|---|---|---|---|
| 5,213,361 A | 5/1993 | Satoh et al. | |
| 6,283,500 B1 | 9/2001 | Eckert et al. | |
| 6,834,886 B2 | 12/2004 | Hasebe et al. | |
| 7,000,943 B2 | 2/2006 | Hasebe et al. | |
| 7,131,664 B1 | 11/2006 | Pang et al. | |
| 7,137,647 B2 | 11/2006 | Adomeit | |
| 7,152,880 B1 * | 12/2006 | Pang et al. | 280/743.2 |
| 7,243,947 B2 | 7/2007 | Bosch | |
| 7,607,683 B2 * | 10/2009 | Fischer et al. | 280/730.1 |
| 7,625,008 B2 * | 12/2009 | Pang et al. | 280/743.1 |
| 2006/0028009 A1 | 2/2006 | Hasebe et al. | |
| 2006/0186647 A1 | 8/2006 | Bosch | |
| 2006/0279072 A1 | 12/2006 | Hanawa et al. | |
| 2007/0018438 A1 * | 1/2007 | Hasebe et al. | 280/729 |
| 2007/0108753 A1 | 5/2007 | Pang et al. | |
| 2007/0262572 A1 | 11/2007 | Fischer et al. | |
| 2008/0007036 A1 * | 1/2008 | Furuno et al. | 280/743.1 |
| 2008/0054613 A1 | 3/2008 | Narimoto et al. | |

* cited by examiner

*Primary Examiner* — Toan C To
*Assistant Examiner* — Drew Brown
(74) *Attorney, Agent, or Firm* — Tarolli, Sundheim, Covell & Tummino LLP

(57) ABSTRACT

A bi-lobular air bag (14) has first and second lobes (232 and 234) defined at least partially by a central recess (230). The air bag (14) includes a central panel (210) formed in an endless loop and including a longitudinal slit (276) that at least partially defines an opening (270) in the central panel. First and second side panels (212 and 214) have peripheries (290) interconnected with respective edge portions (250 and 252) of the central panel (210). A recess panel (216) has a periphery (286) interconnected with portions of the center panel on opposite sides of the longitudinal slit (276). The recess panel (216) is folded and has overlying portions interconnected to form a pleat (306) that helps define the first and second lobes (232 and 234) of the air bag (14).

17 Claims, 5 Drawing Sheets

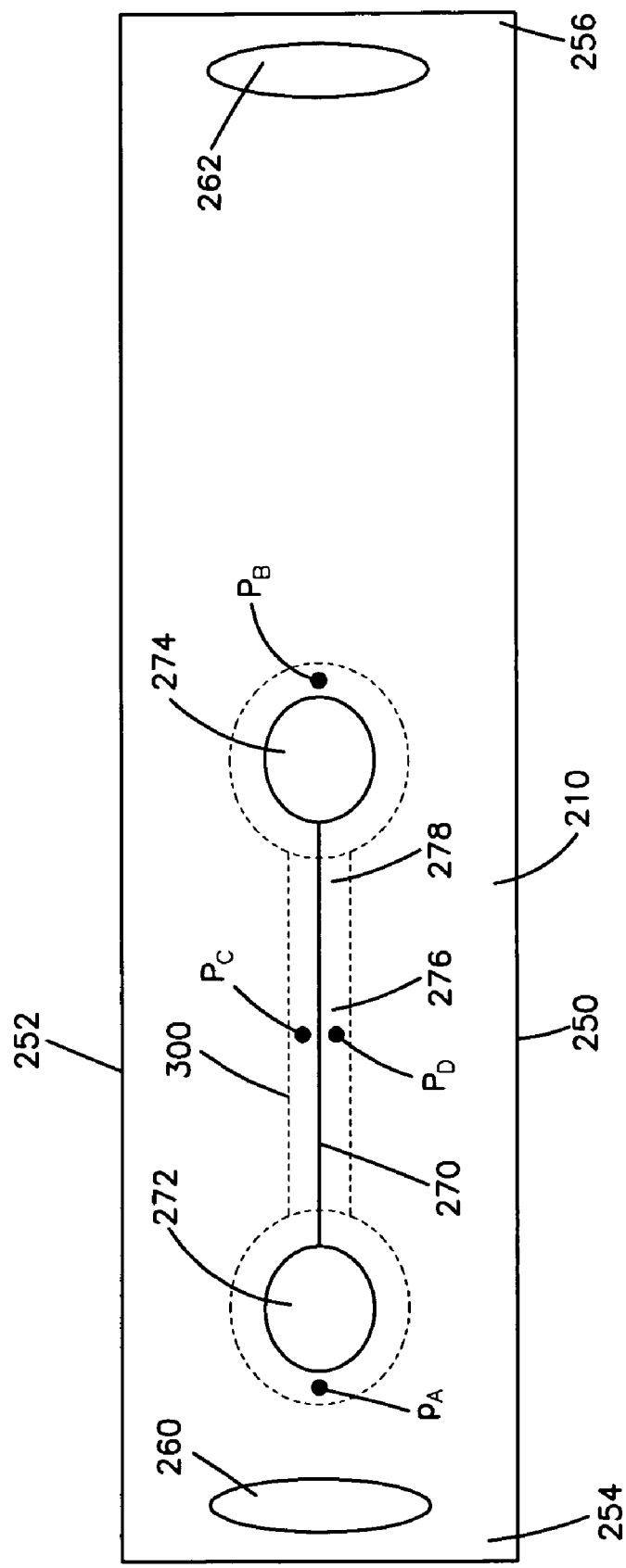

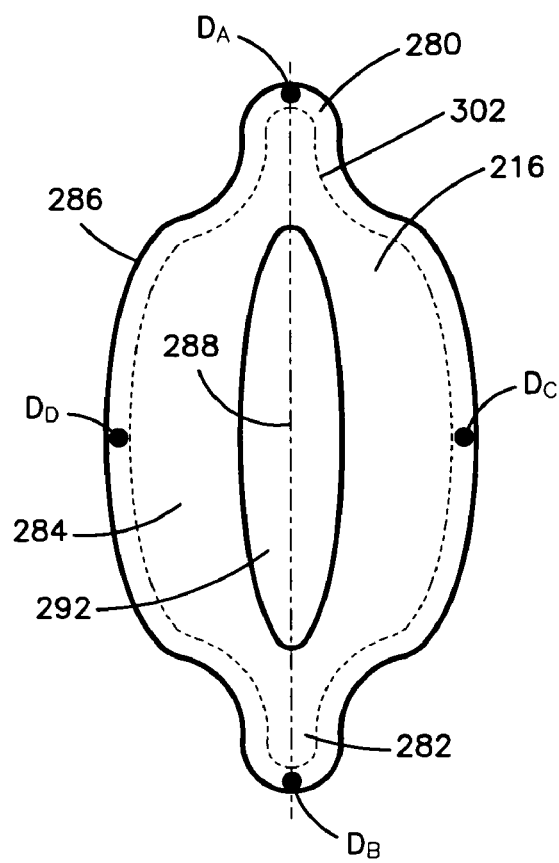
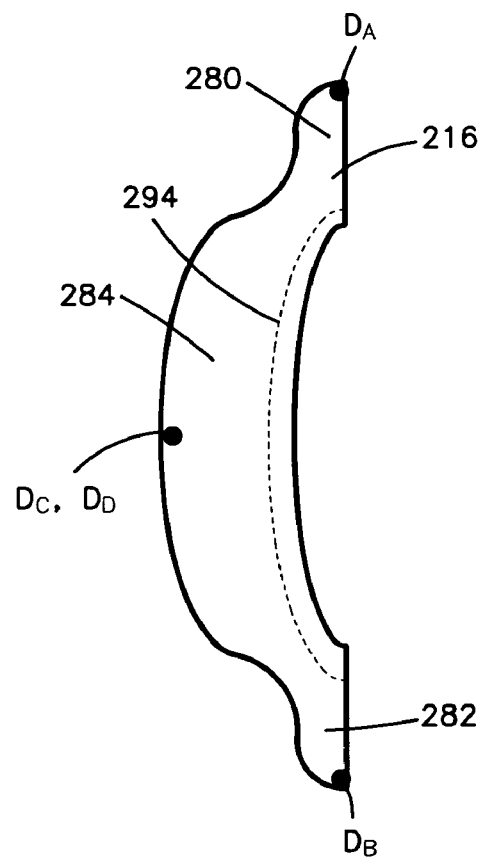
Fig.5A          Fig.5B
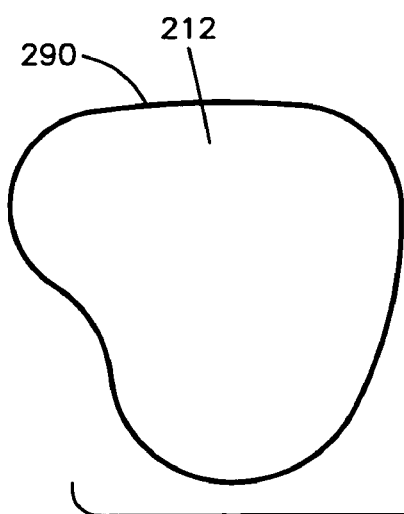
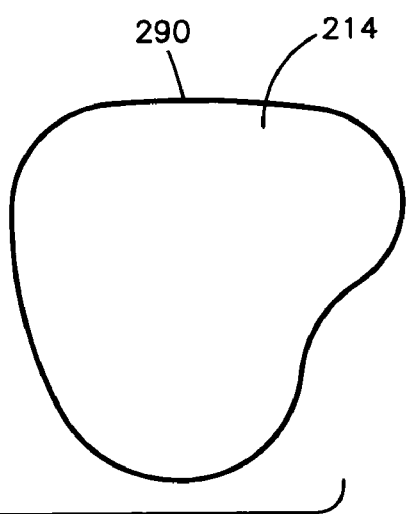
Fig.6

US 7,980,592 B2

BI-LOBULAR AIR BAG

RELATED APPLICATIONS

This application is a continuation-in-part of U.S. patent application Ser. No. 11/432,062, filed on May 11, 2006 now U.S. Pat. No. 7,607,683, which is hereby incorporated by reference.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to a bi-lobular air bag having first and second lobes defined at least partially by a central recess. The air bag includes a central panel that is formed in an endless loop and includes a longitudinal slit that at least partially defines an opening in the central panel. A first side panel has a periphery interconnected with a first edge portion of the central panel. A second side panel has a periphery interconnected with a second edge portion of the central panel. A recess panel has a periphery interconnected with portions of the center panel on opposite sides of the longitudinal slit. The recess panel is folded and has overlying portions interconnected to form a pleat that helps define the first and second lobes of the air bag.

The present invention also relates to an apparatus for helping to protect an occupant of a vehicle. The apparatus includes an inflatable vehicle occupant protection device inflatable between an instrument panel of the vehicle and a vehicle occupant. The protection device includes a central recess adapted to receive the occupant's head and first and second lobes on opposite sides of the recess adapted to receive the occupant's shoulders. The protection device includes a center panel that helps define the recess and the lobes. The central panel includes a longitudinal slit that at least partially defines an opening in the center panel. A recess panel has a periphery interconnected with portions of the center panel on opposite sides of the longitudinal slit. The recess panel has a pleated construction that helps define the first and second lobes of the air bag.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 4-6 are plan views illustrating component parts of the bi-lobular air bag of FIGS. 1-3.

DETAILED DESCRIPTION OF THE INVENTION

Figure 1:
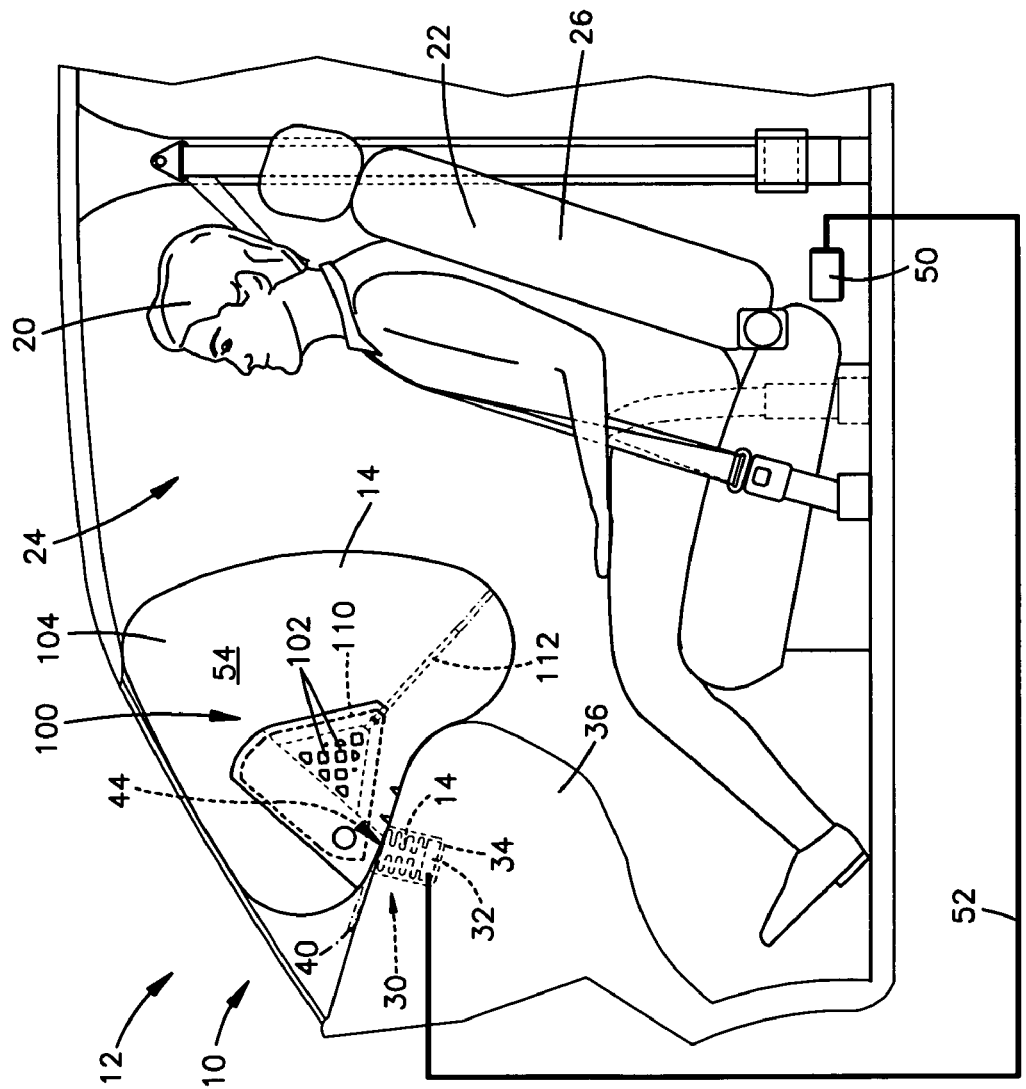
FIG. 1 is a schematic side view illustrating an apparatus for helping to protect an occupant of a vehicle, according to an embodiment of the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12. Those skilled in the art will appreciate that the apparatus 10 disclosed herein could be adapted for a driver side vehicle occupant (not shown) or occupants of rearward rows of the vehicle 12, such as a $2^{nd}$ row, $3^{rd}$ row, etc., of the vehicle (not shown).

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation.

By way of example, in the embodiment of FIG. 1, the air bag 14 includes a vent 100 that is selectively actuatable to release inflation fluid from the inflatable volume 54 of the air bag 14. The vent 100 may have various configurations. In the embodiment illustrated in FIG. 1, the vent 100 includes one or more vent openings 102 formed in a side panel 104 of the air bag 14, a vent door 110 secured to the side panel, and a flexible elongated member 112, such as a tether, secured to the door panel.

The vent door 110 is secured to the side panel 104 by known means (not shown), such as stitching, ultrasonic welding, heat bonding, or adhesives. The vent 100 has an open condition in which the vent door 110 is positioned away from the vent openings 102 and thereby permits inflation fluid to vent, i.e., flow, through the vent openings. In the open condition, the vent door 110 is folded away from the vent openings 102 and held in place by a releasable tear stitch. The tether 112 has a first end portion secured to the vent door 110 and an opposite second end portion secured to the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

When an event occurs which inflation of the air bag 14 is desired, the vent 100 responds to vehicle conditions, occupant conditions, or both to help control inflation and deployment of the air bag. For example, the air bag 14 may be constructed such that the vent 100 is actuated (e.g., closed) in response to unobstructed deployment of the air bag 14 when the occupant is in a normally seated position. In this configuration, the air bag 14 may also be constructed to block actuation of the vent 100 (e.g., remain opened) in response to the obstructed deployment of the air bag 14 when, for example, the occupant is away from the normally seated position.

Figure 2:
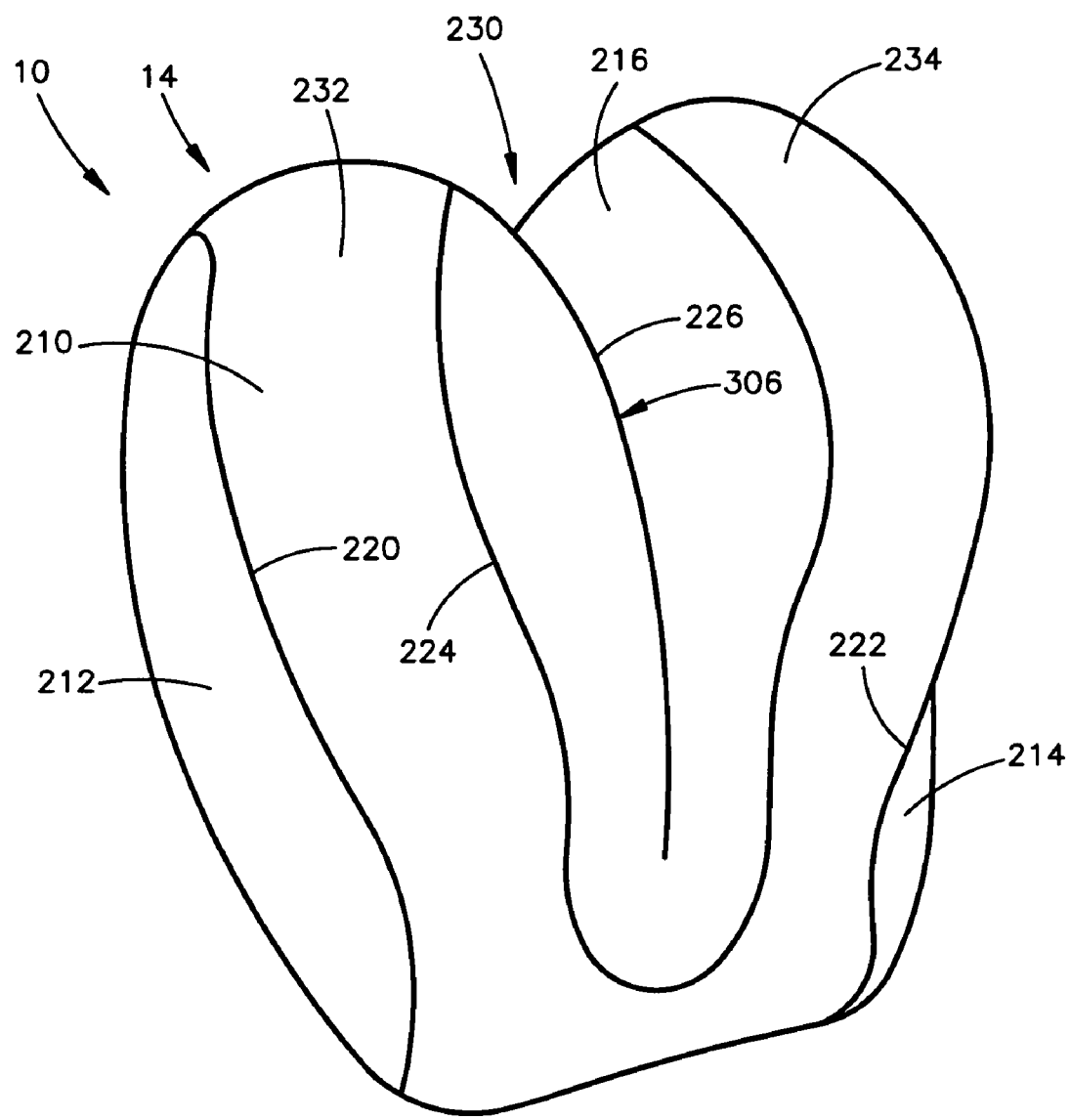
FIG. 2 is a frontal perspective view of a bi-lobular air bag of the apparatus in accordance with the present invention in an inflated condition.
Figure 3:
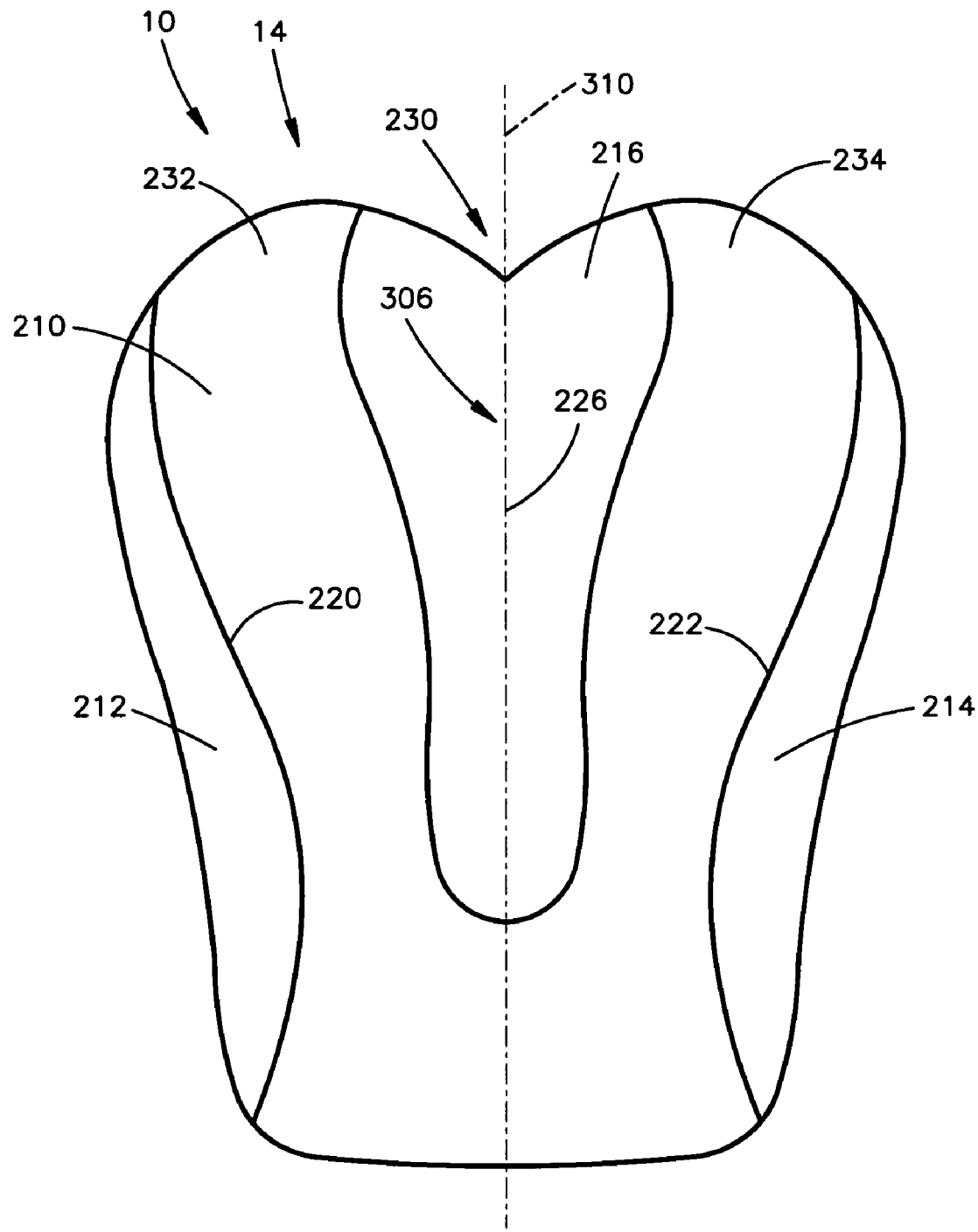
FIG. 3 is a front view of the bi-lobular air bag of FIG. 2.

FIGS. 2 and 3 illustrate the air bag 14 from the perspective of the occupant 20 of the vehicle 12 depicted in FIG. 1. Referring to FIGS. 2 and 3, the air bag 14 includes a central recess 230, a first lobe 232 positioned to the left (i.e., inboard) of the recess as viewed in FIGS. 2 and 3, and a second lobe 234 positioned to the right (i.e., outboard) of the recess as viewed in FIG. 3. The central recess 230 defines a portion of the air bag 14 adapted to receive certain portions of the occupant 20, such as the head and thorax. Due to this construction, the central recess 230 may be positioned further from the occupant 20 when in the inflated and deployed condition (see FIG. 1). This helps ensure that the central portion of the air bag 14, the portions that receive the occupant's head and thorax, is fully deployed at the time the occupant 20 engages the air bag.

The central recess 230 of the bi-lobular air bag 14 provides relief for the head. This shape bag can also help support the occupant's head for angular impacts. The recess 230 provides an area in the bag where the occupant's head fits to minimize bag interaction. This shape causes the bag to load more on the shoulders than the head. The recess 230 may also be positioned to provide a "pocket" for a rear facing infant seat.

As shown in FIGS. 2 and 3, the air bag 14 includes a center panel 210, a first side panel 212 that forms a left side of the air bag, a second side panel 214 that forms a right side of the air bag, and an recess panel 216. The panels 210, 212, 214, and 216 are interconnected at seams by known means, such as stitching, ultrasonic welding, heat bonding, or adhesives, to define the structure of the air bag 14. In the embodiment of FIGS. 2 and 3, a first or left seam 220 interconnects the first side panel 212 to the center panel 210. A second or right seam 222 interconnects the second side panel 214 to the center panel 210. A central seam 224 interconnects the recess panel 216 to the center panel 210. A pleat 226 formed in the recess panel 216 helps define the bi-lobular shape of the air bag 14.

FIGS. 4-6 illustrate the individual component panels used to construct an air bag 14 in accordance with the present invention. As shown in FIG. 4, the center panel 210 is generally elongated and rectangular with first and second longitudinal edge portions 250 and 252 and opposite end portions 254 and 256. The center panel 210 also includes inflator openings 260 and 262 located at the opposite end portions 254 and 256, respectively.

The center panel 210 further includes a central opening 270. The central opening 270 has a first rounded portion 272 positioned proximate the inflator opening 260. A second rounded portion 274 is spaced from the first rounded portion 272. A longitudinal slit 276 interconnects the first and second rounded portions 272 and 274. The periphery 278 of the central opening 270 is defined as the periphery of the first and second rounded portions 272 and 274, and the length of portions of the center panel 210 on opposite sides of the slit 276.

As shown in FIG. 5a, the recess panel 216 is generally elongated with rounded contours with rounded first and second end portions 280 and 282. A central portion 284 of the recess panel 216 has outwardly curved edge portions that flare outward from and extends between the end portions 280 and 282. The shape or configuration of the recess panel 216 symmetrical with respect to a central fold line 288 of the recess panel. Optionally, the recess panel 216 may include an elongated oval-shaped longitudinal opening 292 centered on the fold line 288.

As shown in FIG. 6, the first and second side panels 212 and 214 have generally rounded configurations. Peripheral portions 290 of the first and second side panels 212 and 214 have lengths about equal to the lengths of the first and second longitudinal edge portions 250 and 252 of the center panels 210. For simplicity, the first and second side panels 212 and 214 are shown in FIG. 6 without the optional vents described above.

The center panel 210, first and second side panels 212 and 214, and recess panel 216 are interconnected to construct the air bag 14. The panels 210, 212, 214, and 216 may be interconnected in any desired order which, for example, may be selected for purposes of ease in manufacture. Prior to connecting the recess panel 216 to the center panel 210, the recess panel is folded in half along the fold line 288, as shown in FIG. 5b. The recess panel 216 is then interconnected by known means, such as stitching, ultrasonic welding, heat bonding, or adhesives, along a stitch line 294, thus forming a pleat 306.

The recess panel 216 is connected to the center panel 210. To do this, point $D_A$ on the recess panel 216 is lined up with point $P_A$ on the center panel 210. Point $D_B$ on the recess panel 216 is lined up with point $P_B$ on the center panel 210. Point $D_C$ on the recess panel 216 is lined up with point $P_C$ on the center panel 210. Point $D_D$ on the recess panel 216 is lined up with point $P_D$ on the center panel 210. This recess panel 216 is then connected to the center panel 210 by known means, such as stitching, ultrasonic welding, heat bonding, or adhesives. This interconnects a periphery 286 of the recess panel with the periphery 278 of the opening 270. The stitching extends along corresponding stitch lines 300 and 302 in the center panel 210 and recess panel 216, respectively.

The center panel 210 is looped such that the end portions 254 and 256 and inflator openings 260 and 262 overlie each other. The center panel 210 thus forms an endless loop with the first and second edge portions 250 and 252 extending the length of the loop. The end portions 254 and 256 are then interconnected by known means, such as stitching, ultrasonic welding, heat bonding, or adhesives. The peripheral portion 290 of the first side panel 212 is interconnected with the first edge portion 250 of the center panel 210 by known means, such as stitching, ultrasonic welding, heat bonding, or adhesives. The peripheral portion 290 of the second side panel 214 is interconnected with the second edge portion 252 of the center panel 210 by known means, such as stitching, ultrasonic welding, heat bonding, or adhesives.

The air bag 14, constructed in this manner and when inflated, forms the central recess 230, first lobe 232, and second lobe 234 (see FIGS. 2 and 3). The pleat 306 is centrally located on the air bag 14 along a longitudinal centerline 310 of the air bag. The pleat 306 forms the central low point in the recess 230 and therefore helps determine the location, length, and extent of the recess.

Those skilled in the art will appreciate that, according to the present invention, the configuration of the central recess 230 and, thus, the lobes 232 and 234, depends at least partially on the shape, configuration, and location of the opening 270 in the center panel, the shape and configuration of the recess panel 216, and the shape, configuration, and location of the connection 294, and thus the pleat 306 of the recess panel.

More particularly, the recess panel 216, through its shape, configuration, and orientation, helps define the shape of the lobes 232 and 234, the depth of the recess 230, and the angle/steepness at which the lobes project from the centerline 310. The shape and configuration of the opening 270 in the center panel 210 (i.e., the slit 276 and the openings 272 and 274) also help determine helps define the shape of the lobes 232 and 234, the depth of the recess 230, and the angle/steepness at which the lobes project from the centerline 310.

Advantageously, the air bag 14 may of the present invention may not require tethers or other internal connections for restricting relative movement of the air bag panels in order to achieve the illustrated bi-lobular configuration. Through careful selection of the configuration of the panels 210, 212, 216, and 216, the configuration of the opening 270 in the center panel, and the configuration of the pleat 306, the construction of the air bag 14 can be simplified in that it requires a fewer number of panels, less material, and fewer assembly steps. The construction of the air bag can thus be reduced.

From the above description of the invention, those skilled in the art will perceive improvements, changes and modifications. Such improvements, changes and modifications within the skill of the art are intended to be covered by the appended claims.

Having described the invention, the following is claimed:

1. A bi-lobular air bag having first and second lobes defined at least partially by a central recess, the air bag comprising:
   a central panel formed in an endless loop, the central panel comprising a longitudinal slit that at least partially defines an opening in the central panel;
   a first side panel having a periphery interconnected with a first edge portion of the central panel;
   a second side panel having a periphery interconnected with a second edge portion of the central panel; and
   a recess panel having a periphery interconnected with portions of the central panel on opposite sides of the longitudinal slit, the recess panel being folded and having overlying portions interconnected to form a pleat that helps define the first and second lobes of the air bag;
   the air bag being free from internal tethers for defining the first and second lobes.

2. The bi-lobular air bag recited in claim 1, wherein the opening in the central panel comprises rounded openings at opposite ends of the slit.

3. The bi-lobular air bag recited in claim 2, wherein the recess panel comprises narrowed rounded opposite end portions interconnected with the rounded openings, the recess panel further comprising outwardly curved edge portions that extend between the rounded end portions, the outwardly curved edge portions being interconnected with portions of the center central panel on opposite sides of the slit.

4. The bi-lobular air bag recited in claim 1, wherein the air bag is free from internal tethers for restricting relative movement between the panels.

5. The bi-lobular air bag recited in claim 1, wherein the pleat is configured to extend along a low point of the recess.

6. The bi-lobular air bag recited in claim 1, wherein the central recess is adapted to receive the occupant's head and the first and second lobes are adapted to receive the occupant's shoulders.

7. An apparatus for helping to protect an occupant of a vehicle, the apparatus comprising:
   an inflatable vehicle occupant protection device inflatable between an instrument panel of the vehicle and a vehicle occupant, the protection device comprising a central recess adapted to receive the occupant's head and first and second lobes on opposite sides of the recess adapted to receive the occupant's shoulders, the protection device comprising:
   a central panel that helps define the recess and the lobes, the central panel comprising a longitudinal slit that at least partially defines an opening in the central panel; and
   a recess panel having a periphery interconnected with portions of the central panel on opposite sides of the longitudinal slit, the recess panel having a pleated construction that helps define the first and second lobes of the protection device;
   the protection device being free from internal tethers for defining the first and second lobes.

8. The apparatus recited in claim 7, wherein the opening in the central panel comprises rounded openings at opposite ends of the slit.

9. The apparatus recited in claim 8, wherein the recess panel comprises narrowed rounded opposite end portions interconnected with the rounded openings, the recess panel further comprising outwardly curved edge portions that extend between the rounded end portions, the outwardly curved edge portions being interconnected with portions of the central panel on opposite sides of the slit.

10. The apparatus recited in claim 7, wherein the central panel, first and second side panels, and the recess panel define the bi-lobular configuration of the protection device free from internal tethers for restricting relative movement between the panels.

11. The apparatus recited in claim 7, wherein the recess panel comprises a pleat that is configured to extend along a low point of the recess.

12. A bi-lobular air bag having first and second lobes defined at least partially by a central recess, the air bag comprising:
a central panel formed in an endless loop, the central panel comprising a longitudinal slit that at least partially defines an opening in the central panel;
a first side panel having a periphery interconnected with a first edge portion of the central panel;
a second side panel having a periphery interconnected with a second edge portion of the central panel; and
a recess panel having a periphery interconnected with portions of the central panel on opposite sides of the longitudinal slit, the recess panel being folded and having overlying portions interconnected to form a pleat that helps define the first and second lobes of the air bag;
wherein the pleat is configured to extend along a longitudinal centerline of the air bag, the centerline extending substantially vertically as viewed from the perspective of a vehicle occupant.

13. An apparatus for helping to protect an occupant of a vehicle, the apparatus comprising:
an inflatable vehicle occupant protection device inflatable between an instrument panel of the vehicle and a vehicle occupant, the protection device comprising a central recess adapted to receive the occupant's head and first and second lobes on opposite sides of the recess adapted to receive the occupant's shoulders, the protection device comprising:
a central panel that helps define the recess and the lobes, the central panel comprising a longitudinal slit that at least partially defines an opening in the central panel; and
a recess panel having a periphery interconnected with portions of the central panel on opposite sides of the longitudinal slit, the recess panel having a pleated construction that helps define the first and second lobes of the protection device;
wherein the recess panel comprises a pleat configured to extend along a longitudinal centerline of the protection device, the centerline extending substantially vertically as viewed from the perspective of the occupant.

14. A bi-lobular air bag having first and second lobes defined at least partially by a central recess, the air bag comprising:
a central panel formed in an endless loop, the central panel comprising a longitudinal slit that at least partially defines an opening in the central panel, the opening comprising rounded openings at opposite ends of the slit;
a first side panel having a periphery interconnected with a first edge portion of the central panel;
a second side panel having a periphery interconnected with a second edge portion of the central panel; and
a recess panel having a periphery interconnected with portions of the central panel on opposite sides of the longitudinal slit, the recess panel being folded and having overlying portions interconnected to form a pleat that helps define the first and second lobes of the air bag.

15. The bi-lobular air bag recited in claim 14, wherein the recess panel comprises narrowed rounded opposite end portions interconnected with the rounded openings, the recess panel further comprising outwardly curved edge portions that extend between the rounded end portions, the outwardly curved edge portions being interconnected with portions of the central panel on opposite sides of the slit.

16. An apparatus for helping to protect an occupant of a vehicle, the apparatus comprising:
an inflatable vehicle occupant protection device inflatable between an instrument panel of the vehicle and a vehicle occupant, the protection device comprising a central recess adapted to receive the occupant's head and first and second lobes on opposite sides of the recess adapted to receive the occupant's shoulders, the protection device comprising:
a central panel that helps define the recess and the lobes, the central panel comprising a longitudinal slit that at least partially defines an opening in the central panel, the opening comprising rounded openings at opposite ends of the slit; and
a recess panel having a periphery interconnected with portions of the central panel on opposite sides of the longitudinal slit, the recess panel having a pleated construction that helps define the first and second lobes of the protection device.

17. The apparatus recited in claim 16, wherein the recess panel comprises narrowed rounded opposite end portions interconnected with the rounded openings, the recess panel further comprising outwardly curved edge portions that extend between the rounded end portions, the outwardly curved edge portions being interconnected with portions of the central panel on opposite sides of the slit.

* * * * *